Jan. 28, 1969 P. BESSOT 3,424,289

INTERLOCKING CLUTCH TEETH

Filed Feb. 3, 1967

United States Patent Office 3,424,289
Patented Jan. 28, 1969

3,424,289
INTERLOCKING CLUTCH TEETH
Pierre Bessot, Billancourt, France, assignor to Regie Nationale des Usines Renault, Billancourt, France
Filed Feb. 3, 1967, Ser. No. 613,928
Claims priority, application France, Feb. 15, 1966, 49,651
U.S. Cl. 192—108      2 Claims
Int. Cl. F16d *11/10, 13/60*

ABSTRACT OF THE DISCLOSURE

A dog clutch of the striking-ring type which comprises a companion gear and a striking-ring having on that portion corresponding to the companion gear a circular groove having a depth less than and a width greater than the radial and axial dimensions, respectively, of the dogs of said gear. The dog clutch outline is concave in the zone of engagement corresponding to the depth of the groove. The striking-ring dogs have a conventional outline and there is an angular clearance in the zone of engagement extending out of the groove to provide clearance.

---

An improvement in dog clutches of the striking-ring type is already known, for example Patent 3,043,414 to Peras and assigned to a common assignee, which is applicable notably to synchronisers of transmission mechanisms or gearboxes and consisting, with a view to prevent the untimely disengagement of the clutch dogs, in providing, on the one hand, on the dog-carrying portion of the striking-ring corresponding to the co-acting gear to be engaged, a circular groove of a depth inferior to the height of said striking-ring dogs and of a width greater than that of the dogs of said gear, and on the other hand different outlines of these dogs in the zone corresponding to the depth of said groove, in order to obtain in the engaged condition of said dogs an axial locking action in said groove due to a slight relative shift of the two sets of dogs.

According to a specific form of embodiment disclosed in the aforementioned patent and intended for preserving satisfactory bearing surfaces between the dogs of the striking-ring and those of its companion gear, it is contemplated to give to the dogs of said striking-ring and to the dogs of its hub two different pressure angles on either side of the bottom of said groove, the dog teeth having a single pressure angle equal to the angle contemplated in the striking-ring beyond the groove bottom and greater than the other.

It is the object of the present invention to provide a form of embodiment advantageous in that it requires the use of a special outline only in the dogs, this specific form of embodiment being characterised in that these dogs have a concave outline of which the hollow corresponds to the bottom of said groove, the striking-ring dogs having a conventional contour.

Various advantages deriving from this solution are set forth in the following description of a specific form of embodiment of this invention which is described hereinafter by way of example with reference to the attached drawing, in which.

Figure 1:
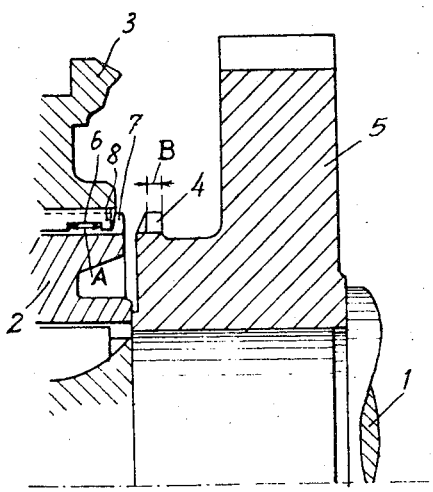
FIGURES 1 and 2 illustrate diagrammatically in axial section the component elements of a synchromesh unit to which this invention is applicable.

In the exemplary synchroniser selected to illustrate this invention the reference numeral 1 designates the shaft on which a synchroniser hub 2 is keyed as usual, this hub 2 having mounted thereon through splines a striking-ring 3 adapted to be brought into meshing engagement with the dog teeth 4 of a companion gear 5 mounted for loose rotation on the same shaft 1.

This dog engagement, as already known, takes place only upon completion of the synchronization obtained as a rule by means of friction, cone or ring clutch means (not shown) interposed to this end between the striking-ring and the gear.

Figure 2:
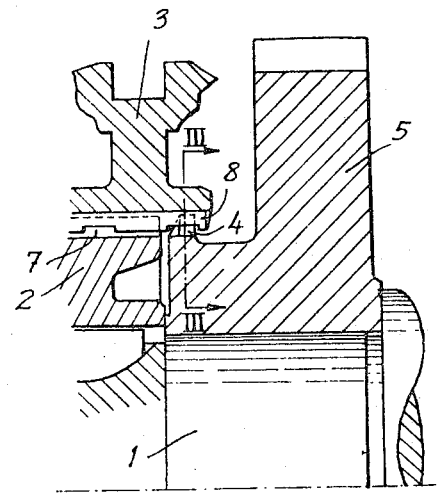

As far as this invention is concerned, and as clearly visible in FIGURES 1 and 2 of the drawing, there is provided on that portion of the dogs of striking-ring 3 which are to engage the dogs 4 of gear 5 an annular groove 6 having a depth inferior to the height, and a width A greater than the width B, of the gear dogs 4.

The splines constituting the dogs 7 of hub 2 and those constituting the dogs 8 of striking-ring 3 have the same outline and cross sectional contour, save for the necessary sliding clearance, and may be of a conventional standardized type.

Figure 3:
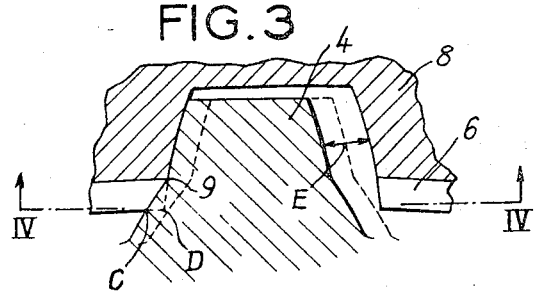
FIGURE 3 is a section taken upon the line III—III of FIGURE 2, showing a separate dog tooth of the gear, and the corresponding dogs of the striking-ring when they are in mutual engagement and under load or torque-transmitting conditions.
Figure 4:
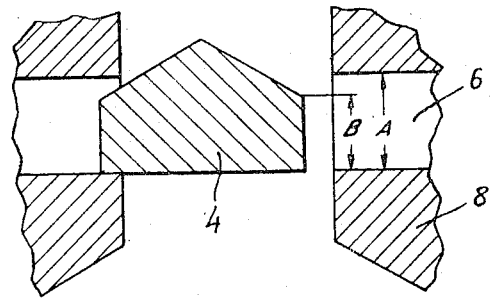
FIGURE 4 is a section taken upon the line IV—IV of FIGURE 3.

The dog teeth 4 have a concave outline and a hollow corresponding in shape to the bottom of groove 6, and in the example illustrated (which however should not be construed as limiting the scope of the invention) this outline comprises a reentrant angle 9. More particularly, these dogs 4 have the same outline as dogs 8 in the portion thereof intended to engage these dogs 8 beyond the bottom of said groove 6, but their thickness is inferior to the distance between teeth of dogs 8, thus providing a possible angular clearance designated by the letter E in FIGURE 3. The thickness of dogs 4, in the portion thereof corresponding to the depth of groove 6, increases within the limits set by the necessary axial interpenetration of dogs 8 and 4 (see the dashed outline of dogs 4 in FIGURE 3), and as a result of this concave outline of the dog teeth 4, in the engaged position under load as shown in thick lines in FIGURES 3 and 4 an axial locking action is applied to each tooth on a surface area bounded in FIGURE 3 by points 9, C and D.

This construction is advantageous, in comparison with the structure already known, and from the functional point of view, in that it increases the strength of the dog clutch, due to the greater width of the base of each dog, while increasing to a considerable extent the height of the bearing surface area obtaining on the side faces of the splines between the striking ring and its hub, thus reducing wear accordingly. In fact, on the one hand the sliding movement takes place on a single pressure angle, and on the other hand this pressure angle may be very moderate, this feature facilitating the sliding movements and avoiding the risk of jamming. Moreover, from the point of view of industrial quality the following advantages are derived from this invention:

(1) The control of splines both on the hub and on the striking-ring is simpler and more complete, since the striking ring comprises only one outline. This also applies to the tools used for machining these parts.

(2) It is easier to obtain an accurate assembly having satisfactory sliding properties with conventional (standardized) tools, and in this respect it may be emphasized that as a rule the quality requirements are high upon sliding assemblies (such as hub and striking ring), whereas greater tolerances are admitted in the case of dog driving members (dog clutches). However, the dog quality is not impaired by this difference because the convex-shaped tool necessary for machining these dogs is easier to manufacture.

From the point of view of cost, with this invention:

(i) The machining tools and control instruments are simpler and cheaper (due to the use of a single pressure angle);

(ii) No limitations are required in the cutting methods (possibility of cutting teeth by means of a gear-cutter);

(iii) Standardized splines and tools may be contemplated for the hub and the striking ring, that is, the most expensive parts of the unit.

I claim:

1. A dog clutch coupling device for torque transmission comprising two annular members mounted for relative sliding displacement, said members having engageable teeth, one of said members having a circular groove formed through the teeth, said circular groove having a depth less than the height of engagement of said teeth and having a width greater than the axial length of the teeth of the other of said members, the teeth of said members having different outlines in their zone of engagement corresponding to the depth of the groove and having an angular clearance in their zone of engagement extending out of said groove, to provide for an axial hooking engagement of said teeth in said groove when engaged and under torque, the other of said members having a concave outline dog teeth wherein the hollow thereof corresponds to the bottom of said groove and the outline of said one of said members has a conventional outline.

2. A dog clutch coupling device for transmission synchronizers and the like which in order to prevent untimely disengagement of the dogs comprise a striking-ring and companion gear mounted for relative sliding displacement and having engageable teeth, said striking-ring having a circular groove formed through the teeth, said circular groove having a depth less than and a width greater than the radial and axial dimensions of the teeth of said gear, the teeth of said striking ring and gear having different outlines in their zone of engagement corresponding to the depth of the groove and having an angular clearance in their zone of engagement extending out of said groove which permits and provides an axial hooking engagement of said teeth in said groove when engaged and under torque, and the outline of said companion gear being concave wherein the hollow of said outline corresponds to the bottom of said groove, and said striking-ring dogs have a conventional outline.

References Cited

UNITED STATES PATENTS

| | | | |
|---|---|---|---|
| 2,846,038 | 8/1958 | Brownyer | 192—114 X |
| 2,931,474 | 4/1960 | Zittrell et al. | 192—108 X |
| 3,043,414 | 7/1962 | Peras | 192—114 |
| 3,219,164 | 11/1965 | Henyon | 192—114 |
| 3,305,061 | 2/1967 | Duncan | 192—114 |

BENJAMIN W. WYCHE III, *Primary Examiner.*

U.S. Cl. X.R.

192—114